United States Patent
Balakrishnan et al.

(10) Patent No.: US 7,304,797 B2
(45) Date of Patent: Dec. 4, 2007

(54) INPUTS AND OUTPUTS FOR AN OPTICAL MULTIPLEXER/DEMULTIPLEXER UTILIZING THE GRATING FACET DIFFRACTION ENVELOPE

(75) Inventors: Ashok Balakrishnan, Ottawa (CA); Serge Bidnyk, Ottawa (CA); Matt Pearson, Ashton (CA)

(73) Assignee: Enablence Inc., Kanata, Ontario (CA)

( * ) Notice: Subject to any disclaimer, the term of this patent is extended or adjusted under 35 U.S.C. 154(b) by 271 days.

(21) Appl. No.: 11/143,800

(22) Filed: Jun. 3, 2005

(65) Prior Publication Data
US 2005/0219701 A1    Oct. 6, 2005

Related U.S. Application Data (63) Continuation-in-part of application No. 10/971,129, filed on Oct. 25, 2004, now Pat. No. 7,151,635.

(60) Provisional application No. 60/555,697, filed on Mar. 24, 2004, provisional application No. 60/576,594, filed on Jun. 4, 2004.

(51) Int. Cl.
*G02B 5/18* (2006.01)

(52) U.S. Cl. .................. 359/572; 359/569; 385/37; 385/24; 385/130

(58) Field of Classification Search ............. 385/37, 385/130; 359/572, 569
See application file for complete search history.

(56) References Cited

U.S. PATENT DOCUMENTS

| | | | |
|---|---|---|---|
| 5,966,483 A | 10/1999 | Chowdhury | |
| 6,097,863 A | 8/2000 | Chowdhury | |
| 6,400,509 B1 * | 6/2002 | Sappey et al. | 359/571 |
| 6,421,478 B1 * | 7/2002 | Paiam | 385/24 |
| 2003/0026541 A1 * | 2/2003 | Sappey et al. | 385/37 |

FOREIGN PATENT DOCUMENTS

WO    01/77738    10/2001

\* cited by examiner

*Primary Examiner*—Fayez G. Assaf
(74) *Attorney, Agent, or Firm*—Teitelbaum & MacLean; Neil Teitelbaum; Doug MacLean

(57) ABSTRACT

The invention relates to a planar waveguide reflective diffraction grating for use in an optical device, such as a wavelength division multiplexer, providing an increased bandwidth over conventional planar waveguide reflection diffraction gratings while eliminating the polarization dependent loss (PDL) typically associated therewith. The multiplexer/demultiplexer according to the present invention includes input and output ports optimally positioned in accordance with the grating facet diffraction envelope to minimized back reflection to the input ports and maximize output light collected from different diffraction orders.

20 Claims, 8 Drawing Sheets

INPUTS AND OUTPUTS FOR AN OPTICAL MULTIPLEXER/DEMULTIPLEXER UTILIZING THE GRATING FACET DIFFRACTION ENVELOPE

CROSS-REFERENCE TO RELATED APPLICATIONS

The present application is a continuation in part of U.S. patent application Ser. No. 10/971,129 filed Oct. 25, 2004 now U.S. Pat. No. 7,151,635, which claims priority from U.S. patent application Ser. No. 60/555,697 filed Mar. 24, 2004, the present application also claims priority from U.S. Patent Application No. 60/576,594 filed Jun. 4, 2004, which are all incorporated herein by reference.

TECHNICAL FIELD

The present invention relates to an Optical Multiplexer/Demultiplexer, and in particular to optimizing the position of the input port and of optical channel monitoring output ports in accordance with the grating facet diffraction envelope.

BACKGROUND OF THE INVENTION

In optics, a diffraction grating is an array of fine, parallel, equally spaced grooves ("rulings") on a reflecting or transparent substrate, which grooves result in diffractive and mutual interference effects that concentrate reflected or transmitted electromagnetic energy in discrete directions, called "orders," or "spectral orders."

The groove dimensions and spacings are on the order of the wavelength in question. In the optical regime, in which the use of diffraction gratings is most common, there are many hundreds, or thousands, of grooves per millimeter.

Order zero corresponds to direct transmission or specular reflection. Higher orders result in deviation of the incident beam from the direction predicted by geometric (ray) optics. With a normal angle of incidence, the angle $\theta$, the deviation of the diffracted ray from the direction predicted by geometric optics, is given by the following equation, where m is the spectral order, $\lambda$ is the wavelength, and d is the spacing between corresponding parts of adjacent grooves:

$$\theta = \pm \sin^{-1}\left(\frac{m\lambda}{d}\right)$$

Because the angle of deviation of the diffracted beam is wavelength-dependent, a diffraction grating is dispersive, i.e. it separates the incident beam spatially into its constituent wavelength components, producing a spectrum.

The spectral orders produced by diffraction gratings may overlap, depending on the spectral content of the incident beam and the number of grooves per unit distance on the grating. The higher the spectral order, the greater the overlap into the next-lower order. Diffraction gratings are often used in monochromators and other optical instruments.

By controlling the cross-sectional shape of the grooves, it is possible to concentrate most of the diffracted energy in the order of interest. This technique is called "blazing."

Originally high resolution diffraction gratings were ruled. The construction of high quality ruling engines was a large undertaking. A later photolithographic technique allows gratings to be created from a holographic interference pattern. Holographic gratings have sinusoidal grooves and so are not as bright, but are preferred in monochromators they lead to a much lower stray light level than blazed gratings. A copying technique allows high quality replicas to be made from master gratings, this helps to lower costs of gratings.

Figure 1:
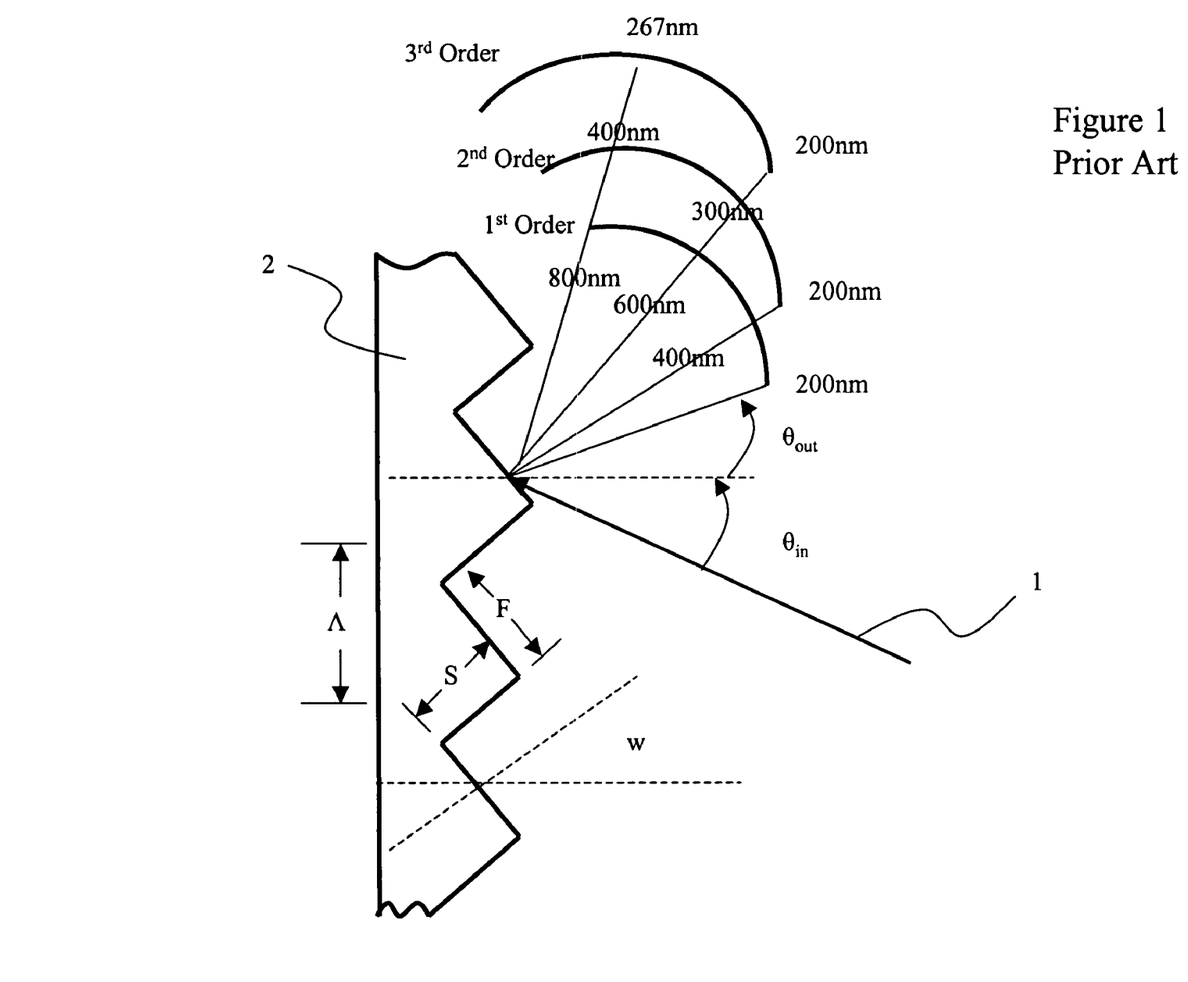
FIG. 1 illustrates a conventional reflective diffraction grating.

A planar waveguide reflective diffraction grating includes an array of facets arranged in a regular sequence. The performance of a simple diffraction grating is illustrated with reference to FIG. 1. An optical beam 1, with a plurality of wavelength channels $\lambda_1, \lambda_2, \lambda_3 \ldots$, enters a diffraction grating 2, with grading pitch A and diffraction order m, at a particular angle of incidence $\theta_{in}$. The optical beam is then angularly dispersed at an angle $\theta_{out}$ depending upon wavelength and the order, in accordance with the grating equation:

$$m\lambda = \Lambda(\sin\theta_{in} + \sin\theta_{out}) \quad (1)$$

From the grating equation (1), the condition for the formation of a diffracted order depends on the wavelength $\lambda_N$ of the incident light. When considering the formation of a spectrum, it is necessary to know how the angle of diffraction $\theta_{Nout}$ varies with the incident wavelength $\theta_{in}$. Accordingly, by differentiating the equation (1) with respect to $\theta_{Nout}$, assuming that the angle of incidence $\theta_{in}$ is fixed, the following equation is derived:

$$\partial\theta_{Nout}/\partial\lambda = m/\Lambda\cos\theta_{Nout} \quad (2)$$

The quantity $d\theta_{Nout}/d\lambda$ is the change of the diffraction angle $\theta_{Nout}$ corresponding to a small change of wavelength $\lambda$, which is known as the angular dispersion of the diffraction grating. The angular dispersion increases as the order m increases, as the grading pitch $\Lambda$ decreases, and as the diffraction angle $\theta_{Nout}$ increases. The linear dispersion of a diffraction grating is the product of this term and the effective focal length of the system.

Since light of different wavelengths $\lambda_N$ are diffracted at different angles $\theta_{Nout}$, each order m is drawn out into a spectrum. The number of orders that can be produced by a given diffraction grating is limited by the grating pitch $\Lambda$, because $\theta_{Nout}$ cannot exceed 90°. The highest order is given by $\Lambda/\lambda_N$. Consequently, a coarse grating (with large $\Lambda$) produces many orders while a fine grating may produce only one or two.

The free spectral range (FSR) of diffraction grating is defined as the largest bandwidth in a given order which does not overlap the same bandwidth in an adjacent order. The order m is important in determining the free spectral range over which continuous dispersion is obtained. For a given input-grating-output configuration, with the grating operation at a preferred diffraction order m for a preferred wavelength $\lambda$, other wavelengths will follow the same path at other diffraction orders. The first overlap of orders occurs when $$m\lambda_m = (m+1)\lambda_{m+1} \quad (3)$$

$$\lambda_{m+1} = \frac{m\lambda_m}{(m+1)} \quad (4)$$

$$\Delta\lambda = \frac{\lambda_m}{m+1} \quad (5)$$

A blazed grating is one in which the grooves of the diffraction grating are controlled to form right triangles with a blaze angle w, as shown in FIG. 1. The selection of the blaze angle w offers an opportunity to optimize the overall efficiency profile of the diffraction grating, particularly for a given wavelength.

Planar waveguide diffraction based devices provide excellent performance in the near-IR (1550 nm) region for Dense Wavelength Division Multiplexing (WDM). In particular, advancements in Echelle gratings, which usually operate at high diffraction orders (40 to 80), high angles of incidence (approx 60°) and large grading pitches, have lead to large phase differences between interfering paths. Because the size of grating facets scales with the diffraction order, it has long been considered that such large phase differences are a necessity for the reliable manufacturing of diffraction-based planar waveguide devices. Thus, existing devices are limited to operation over small wavelength ranges due to the high diffraction orders required (see equation 5).

Furthermore, for diffraction grating-based devices fabricated in a planar waveguide platform, a common problem encountered in the prior art is polarization dependent loss arising from field exclusion of one polarization caused by the presence of conducting metal S (a reflective coating) adjacent to the reflective facets F.

An optical signal propagating through an optical fiber has an indeterminate polarization state requiring that the (de) multiplexer be substantially polarization insensitive so as to minimize polarization dependent losses. In a reflection grating used near Littrow condition, and blazed near Littrow condition, light of both polarizations reflects equally well from the reflecting facets (F in FIG. 1). However, the metalized sidewall facet S introduces a boundary condition preventing light with polarization parallel to the surface (TM) from existing near the surface. Moreover, light of one polarization will be preferentially absorbed by the metal on the sidewall S, as compared to light of the other polarization. Ultimately, the presence of sidewall metal manifests itself in the device performance as polarization-dependent loss (PDL).

There are numerous methods and apparatus for reducing the polarization sensitivity of diffraction gratings. Chowdhury, in U.S. Pat. Nos. 5,966,483 and 6,097,863 describes a reduction of polarization sensitivity by choosing to reduce the difference between first and second diffraction efficiencies of a wavelength within the transmission bandwidth. This solution can be of limited utility because it requires limitations on election of blaze angles and blaze wavelength.

Sappey et al, in U.S. Pat. No. 6,400,509, teaches that polarization sensitivity can be reduced by including reflective step surfaces and transverse riser surfaces, separated by a flat. This solution is also of limited utility because it requires reflective coating on some of the surfaces but not the others, leading to additional manufacturing steps requiring selective treatment of the reflecting interfaces.

The free spectral range of gratings is proportional to the size of the grating facets. It has long been thought that gratings with a small diffraction order could not be formed reliably by means of photolithographic etching, because low order often implies steps smaller or comparable to the photolithographic resolution. The photolithographic resolution and subsequent processing steps blur and substantially degrade the grating performance. Therefore, the field of etched gratings has for practical reasons limited itself to reasonably large diffraction orders typically in excess of order 10. Devices with orders ranging close to order 1 have long been thought to be impractical to realize.

In a conventional reflective-grating device, the spectrometer output angles are selected to maximize the throughput of the intended wavelengths to the intended locations. Little consideration is given to Littrow radiation that may be quite intense, almost as intense as the intended output emission. In the realm of optical telecommunications, light that returns along an input path can be disastrous to the overall performance of an optical system. Accordingly, reflective grating-based devices may introduce problems to telecommunications systems. As a result, nearly all components for telecommunications have a specification for maximum "Return Loss", or "Back-reflection", which has been particularly difficult to achieve using reflective grating technology, in which the device has a fundamental layout that is, by design, optimized for reflecting high intensities of light directly back towards the input fiber.

Furthermore, if multiple diffraction orders are intended for use, such that the same wavelength emerges from a spectrometer at several different angles, there is the likelihood that the intensity of the secondary diffraction orders may be extremely weak (down to infinitesimal amounts). Therefore products such as integrated demulitplexer-channel monitors will achieve poor and possibly insufficient responsivity in the secondary diffraction order channels.

Presently, wavelength separating devices used in optical telecommunications systems are ultimately transmissive in nature, e.g. employing arrayed waveguide gratings or thin-film filters, in which there are no strong interferences caused by light rebounding directly backwards from the component.

An object of the present invention is to overcome the shortcomings of the prior art by providing a multiplexer/demultiplexer with input and output ports optimally positioned in accordance with the grating facet diffraction envelope to minimized back reflection to the input ports and maximize output light collected from different diffraction orders.

SUMMARY OF THE INVENTION

Accordingly, the present invention relates to a planar waveguide optical device comprising:

an input port for launching an input optical signal, which is comprised of a plurality of optical channels;

a reflective waveguide diffraction grating for dispersing the optical signal into a diffraction envelope having a principle diffraction maximum, a plurality of higher order diffraction maxima, and a plurality of diffraction minima therebetween; and a first plurality of output ports outputting said optical channels;

wherein said input port is positioned at one of said diffraction minima to limit the amount of light reflected from the reflective waveguide diffraction grating from re-entering the input port.

Another aspect of the present invention relates to a planar waveguide optical device comprising:

an input port for launching an input optical signal, which is comprised of a plurality of optical channels;

a reflective waveguide diffraction grating for dispersing the optical signal into a diffraction envelope having a principle diffraction maximum, a plurality of higher order diffraction maxima, and a plurality of diffraction minima therebetween; and a first plurality of output ports positioned along the principle diffraction maximum for outputting said optical channels.

Another aspect of the present invention relates to a planar waveguide optical device comprising:

an input port for launching an input optical signal, which is comprised of a plurality of optical channels;

a reflective waveguide diffraction grating for dispersing the optical signal into a diffraction envelope having a principle diffraction maximum, a plurality of higher order diffraction maxima, and a plurality of diffraction minima therebetween;

a first plurality of output ports for outputting said optical channels; and second plurality of output ports positioned along one of the higher order diffraction maxima for outputting light therefrom.

BRIEF DESCRIPTION OF THE DRAWINGS

The invention will be described in greater detail with reference to the accompanying drawings which represent preferred embodiments thereof, wherein.

DETAILED DESCRIPTION

One of the major concerns in the design of planar waveguide diffraction gratings is the manufacturability of the reflecting and sidewall facets F and S, respectively. Furthermore, a major limit to the manufacturability of the facets heretofore, has been the photolithographic resolution limitations. Typical photolithographic procedures are limited to resolutions in the range of 0.5 to 1.0 μm, so the minimal requirement to achieve reasonable performance from a grating is that the reflecting facet size F must be larger than this resolution, say 2.5 to 5 μm or more in size.

In FIG. 1, the light path is simplified by the assumption that the input and output angles $\theta_{in}$ and $\theta_{Nout}$, respectively are identical. This assumption is only to simplify the mathematical treatment of the facet geometry. Accordingly:

$$F \approx \Lambda\cos\theta_{in}; \text{ and} \quad (6)$$

Equation (1) simplifies to $$m\lambda \approx 2\Lambda\sin\theta_{in} \quad (7)$$

Combining equations 6 and 7 yields $$F \approx \frac{m\lambda}{2\tan\theta}. \quad (8)$$

From FIG. 1:

$$\frac{S}{F} \approx \tan\theta_{in} \quad (9)$$

Historically, incidence and output angles of 45° to 65° have been used inevitably leading to grating facet aspect ratio of F/S to be about 1 (see FIG. 1 and Equation 9). At a wavelength of 1550 nm, one finds from equation (6) that facet sizes, for both reflecting F and non-reflecting surfaces S, of 10-17 μm are easily achievable in the prior art, for DWDM applications. This makes grating facets F manufacturable, but at the expense of large non-reflecting facets (or sidewalls) S contributing to the polarization dependent loss. In the prior art, facet size variation is also done by varying the diffraction order m, i.e. adjusting the numerator of equation (8).

Telecommunications networks have evolved from DWDM to CWDM and FTTH networks. The latter two network architectures have channels spanning large wavelength ranges, from ~1250 nm to ~1630 nm. These wide ranges cannot be served by a high-diffraction order device, and often require orders as low as 1. Practitioners of the prior art have not been aware of, or taken advantage of equation (8). At low diffraction orders m and operating angles $\theta_{in}$ and $\theta_{out}$ of 45° to 65° the resulting facet size F for a planar waveguide diffraction grating would be too small to be practically manufacturable. Existing planar waveguide diffraction based devices include AWGs and echelle gratings. Both rely on high diffraction orders; the AWGs need high order operation for guide routing reasons, the echelle technique employs high orders to maintain large facet sizes that are more easily manufactured. Hence, prior art has intrinsic limitations in addressing the CWDM or FTTH network architectures in a planar waveguide platform.

The present invention recognizes the importance of equation (8), in particular the fact that it is possible to increase the grating facet aspect ratio F/S through angular dependence of the denominator. As the diffraction angle is reduced, the facet size increases linearly with $\tan\theta_{in}$. Additionally, inventors recognize that the increase of the facet aspect ratio F/S yields devices with improved polarization dependent loss and larger free spectral range.

For example, in silica-on-silicon, a diffraction order of 5 or less (yielding the smallest practical free spectral range for CWDM or FTTH networks), at a wavelength of 1550 nm, and size of reflecting facet F to exceed 5.0 μm, would require F/S to be increased to more than 3, which can be accomplished by lowering the diffraction angle to about 25°. Thus, the present invention encompasses all planar waveguide diffraction grating designs with the ratio of reflecting to non-reflecting facets (or sidewalls) of at least 3. Other planar waveguide materials include silica, silicon oxynitride, silicon nitride, silicon on insulator, or indium phosphide.

The amount of PDL is strongly dependent on the aspect ratio F/S and the length of the non-reflecting facet S. Conventional echelle designs have an aspect ratio of 1, and are strongly subjected to sidewall dependent PDL; however, for F/S in excess of 3, the non-reflecting facets make substantially smaller contribution to the PDL. By further increasing F/S, it is possible to design manufacturable facets with the non-reflecting grating facet sizes S at or smaller than the wavelength of the reflected light, e.g. S≦3000 nm, preferably ≦2500 nm, even more preferably ≦2000 nm, and ultimately preferably ≦1550 nm. For such gratings, the interaction length of light with the metallized sidewall is so small that PDL-free operation of the device becomes possible.

Therefore, when we enter a regime in which tan(θ) is small, i.e. to achieve a ⅓ ratio or θ<25°, we can reduce sidewall dependent PDL.

From a manufacturability standpoint, if reflecting facets F are large, the facets themselves are reproduced faithfully despite photolithographic resolution limits. Small non-reflecting facets S will likely not be reproduced faithfully, and will be slightly rounded, but grating performance is not affected. Practitioners of prior art no doubt have realized that the pitch governs dispersion as per equation (1). However, it is quite common to equate the pitch of a grating to the normal distance between reflecting facets (the sidewall S in FIG. 1). With that thinking, a distortion to the sidewall S could be equated with a distortion to the pitch. This is a mistaken conception, and in fact the pitch is given by equation (6). Counter-intuitively, the pitch increases with F, not S. The present inventors recognize this fact and can increase the aspect ratio, i.e. decrease S/F, shown in equation (9) without risk of affecting the pitch. In fact, the fidelity of the grating reproduction is limited not by photolithography but by the accuracy of the features on the mask itself. This limit is several orders of magnitude (100-fold) smaller than the photolithographic resolution.

Combining equation (8) and (9), we find that:

$$S \approx \frac{m\lambda}{2} \quad (10)$$

Thus, by choosing a small diffraction order (m=3, 2 or 1, if necessary) one can nearly eliminate PDL, because the sidewall size S becomes less than the wavelength.

Figure 2:
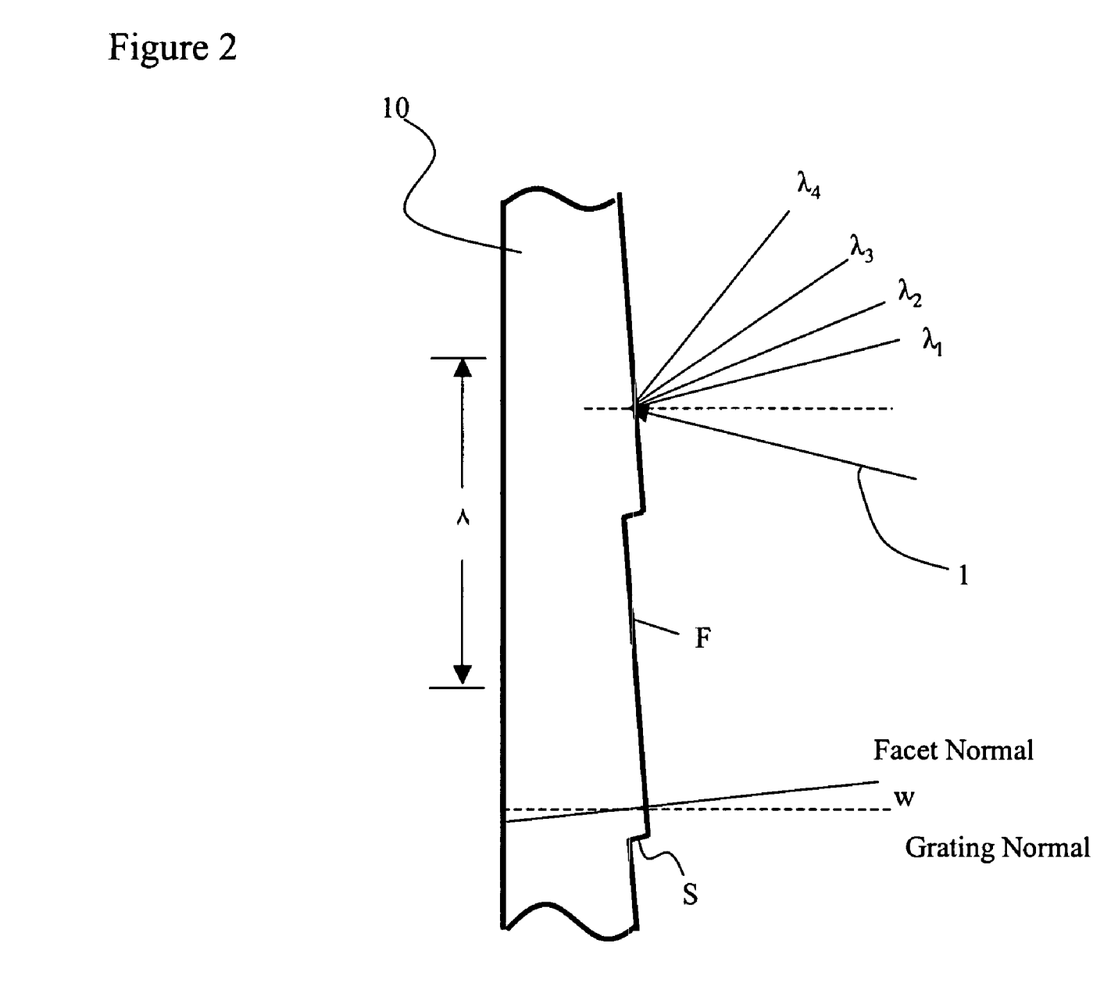
FIG. 2 illustrates a planar waveguide reflective diffraction grating according to the present invention.
Figure 3:
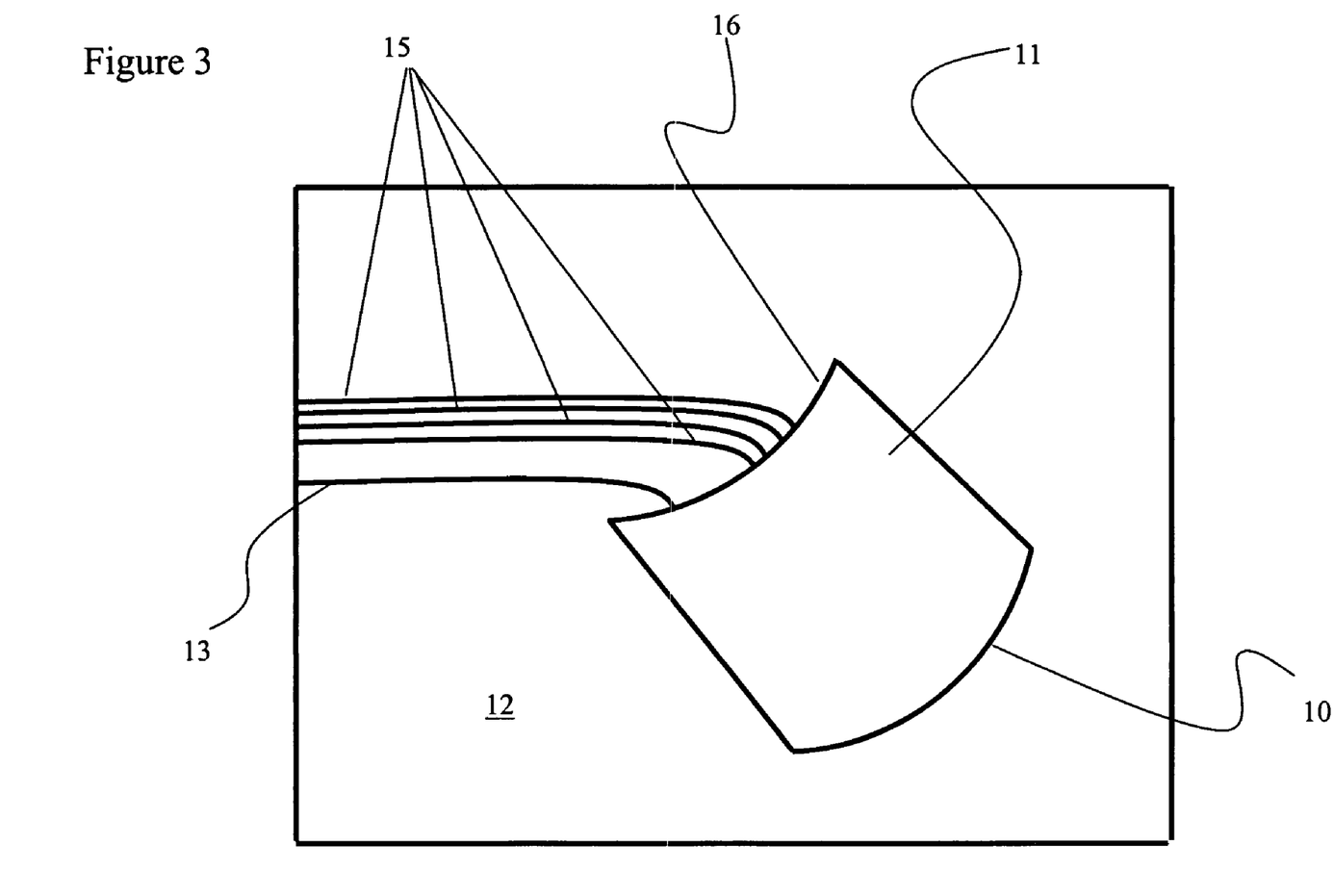
FIG. 3 illustrates an optical device incorporating the planar waveguide reflective diffraction grating according to the present invention.

In a preferred embodiment, illustrated in FIG. 3, a concave reflective diffraction grating 10 is formed at an edge of a slab waveguide 11 provided in chip 12. An input port is defined by an end of a waveguide 13, which extends from an edge of the chip 12 to the slab waveguide 11 for transmitting an input wavelength division multiplexed (WDM) signal, comprising a plurality of wavelength channels ($\lambda_1$, $\lambda_2$, $\lambda_3$ ... ), thereto. The diffraction grating 10, as defined above with reference to FIG. 2, has an aspect ratio (F/S) greater than 5, and a sidewall length S less than or equal to the average wavelength of the wavelength channels ($\lambda_1$, $\lambda_2$, $\lambda_3$ ... ). The input waveguide 13 is positioned to ensure that the incident angle $\theta_{in}$ is less than 30°, and the grating pitch Λ is selected to ensure that the grating 10 provides diffraction in an order of 5 or less. The diffraction grating 10 disperses the input signal into constituent wavelengths and focuses each wavelength channel on a separate output port in the form of an output waveguide 15, the ends of which are disposed along a focal line 16 of the grating 10 defined by a Rowland circle, for transmission back to the edge of the chip 12. The illustrated device could also be used to multiplex several wavelength channels, input the waveguides 15, into a single output signal transmitted out to the edge of the chip 12 via the input waveguide 13. The input and output ports represent positions on the slab waveguide 11 at which light can be launched or captured; however, the ports can be optically coupled with other transmitting devices or simply blocked off.

Specific examples for operating the aforementioned optical device are:

| | | | |
|---|---|---|---|
| $\theta_{in}$ = 5° | 5° | 5° | 6° |
| m = 1 | 2 | 3 | 2 |
| $\lambda_{avg}$ = 1550 nm | 1550 nm | 1550 nm | 1550 nm |
| Λ = 8892 nm | 17784 nm | 26676 nm | 14828 nm |
| F = 8858 nm | 17716 nm | 26574 nm | 14747 nm |
| S = 775 nm | 1550 nm | 2325 nm | 1550 nm |
| F/S = 11.4 | 11.4 | 11.4 | 9.5 |

The efficiency of the diffraction from a grating is a coherent superposition of the diffraction envelope from individual facets. The positioning of the multitude of facets dominates the mode shape of the emissions from the gratings at specific wavelengths, while the size of the individual facets dominates the relative intensity of different modes at different angles/wavelengths. This diffraction envelope is essentially a $(\sin(x)/x)^2$ intensity distribution. By carefully choosing the location of the input to the spectrometer at a minimum of the diffraction envelope, and the required outputs centered about the maximum of the distribution, it should be possible to have optimum transmission to the output of the spectrometer with minimal reflection of light towards the input of the spectrometer.

If secondary diffraction orders are employed as well as the primary orders, then it would be desirable to place the secondary outputs at other maxima of the diffraction envelope, which would improve the signal captured at the secondary outputs, while at the same time reducing the sensitivity of the secondary signal strength to slight changes in grating facet orientation.

The intentional utilization of minima and secondary (or higher) maxima of the grating facet diffraction envelope is new. A design using these minima or maxima explicitly positions inputs and outputs of the grating spectrometer by accounting for the performance of the grating as a whole.

Figure 4:
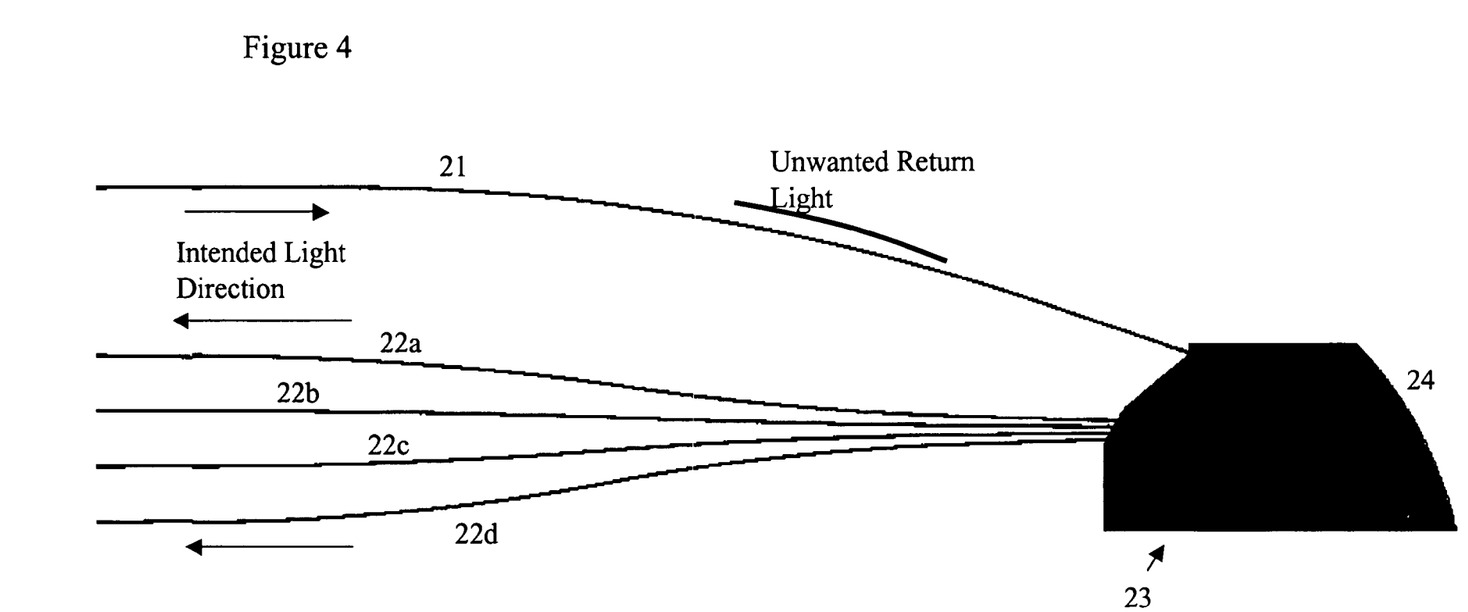
FIG. 4 illustrates an alternative embodiment of an optical device incorporating the planar waveguide reflective diffraction grating according to the present invention with the input waveguide positioned at a minimum of the diffraction envelope.

With reference to FIG. 4, a simple optical demultiplexer is designed with one input channel 21 and four output channels 22a to 22d for Coarse Wavelength Division Multiplexing (CWDM). An optical signal with a plurality of optical channels, defined by center wavelengths $\lambda_1$ to $\lambda_4$, is launched via input channel 21 into a slab waveguide region 23 to be incident on a grating 24. The grating 24 disperses the optical channels according to wavelength, whereby each optical channel $\lambda_1$ to $\lambda_4$ is captured by one of the output channels 22a to 22d.

Figure 5:
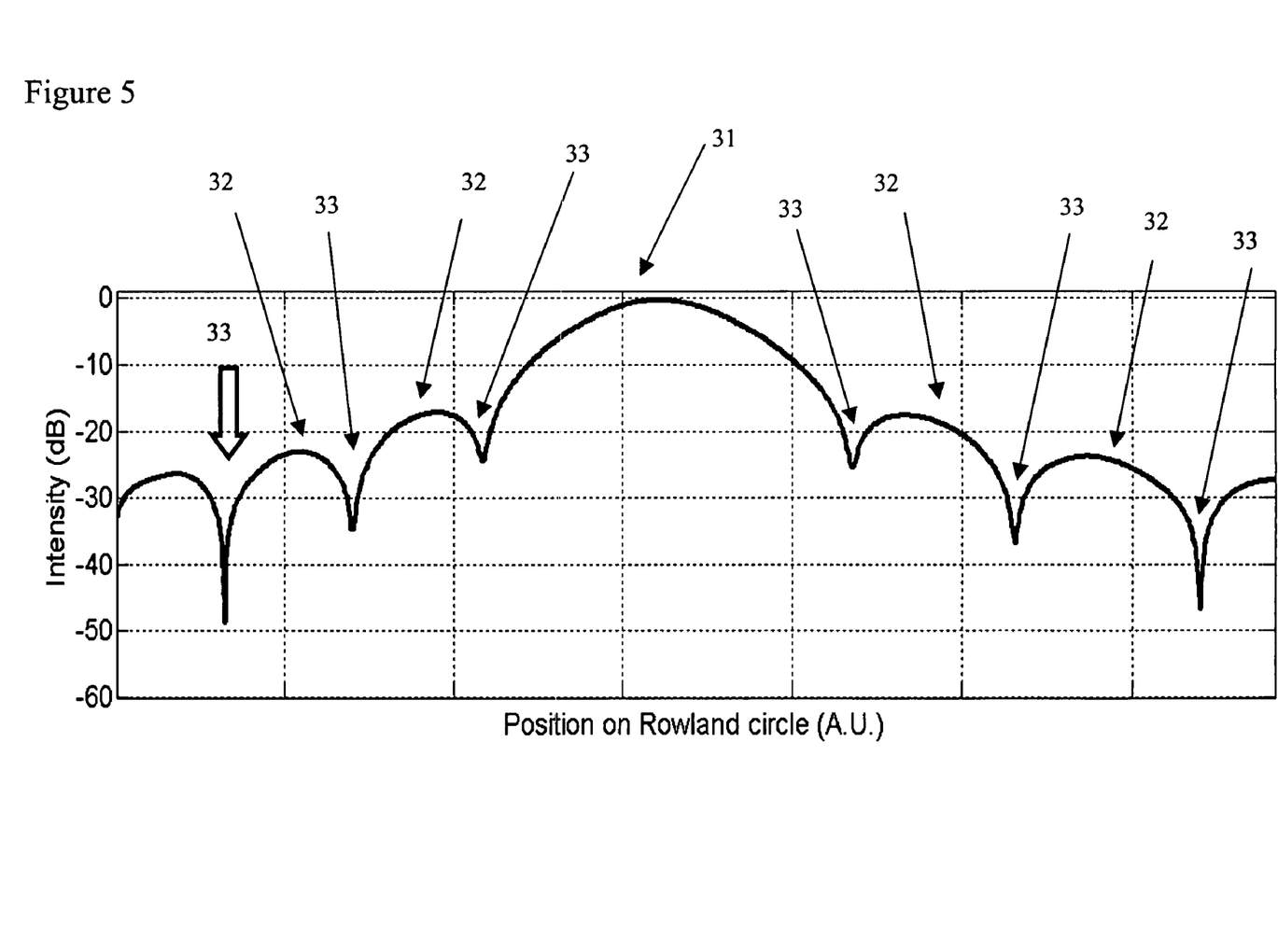
FIG. 5 illustrates a diffraction envelope from the central facet for the device of FIG. 4.

A diffraction envelope from the central facet for the device of FIG. 4 is displayed in FIG. 5. Note the high principle maximum 31 and the multiple higher-order maxima 32 with minima 33 between them. By moving the input guide 21 to a minimum 33 of the diffraction envelope the return light intensity is greatly reduced. Moreover, by moving the output channels 22a to 22d to the principle maximum 31 or at least a higher order maximum 32 the transmitted light is maximized. Obviously, positioning both the input guide 21 and the output guides 22a to 22d in minima 33 and maximum 31 is preferred.

Figure 6:
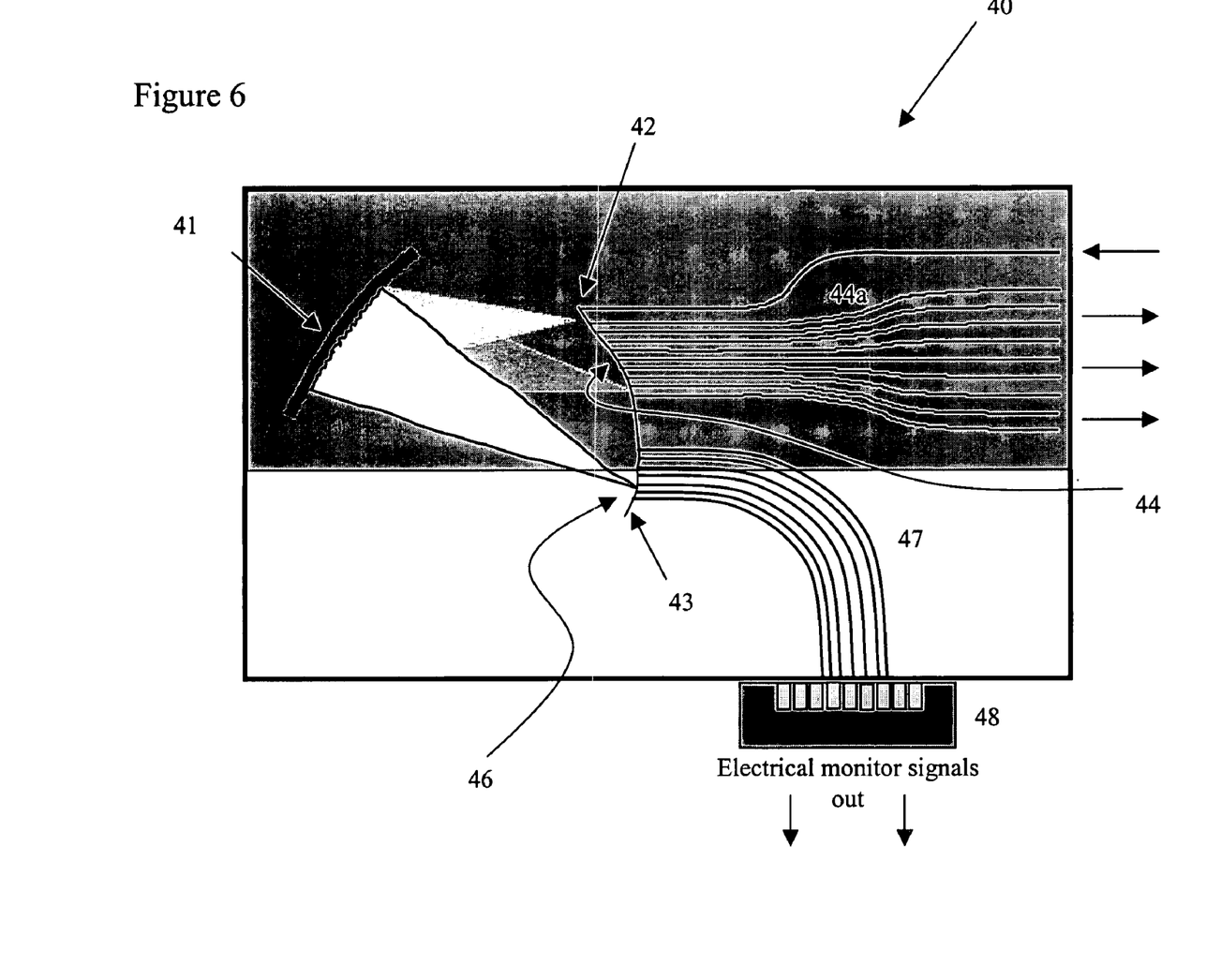
FIG. 6 illustrates an alternative embodiment of an optical device incorporating the planar waveguide reflective diffraction grating according to the present invention with the input waveguide positioned at a minimum of the diffraction envelope and the first and second sets of output waveguides positioned at maximums of the diffraction envelope.

With reference FIG. 6, since the position of the diffraction envelope, the design of grating 41, and the position of the input port 42 are all inter-related, the design of a demultiplexer device 40 is an iterative process starting with the design of the grating 41 to generally provide a diffraction envelope with a sufficient amount of higher order minima and maxima. Preferably, the grating 41 is a concave reflective grating, as disclosed above with reference to FIGS. 2 and 3, with a focal line along a Rowland circle 43. Next, an initial trial position for the input port 42 is selected, and the resulting diffraction envelope is examined. Assuming the input port 42 was not positioned correctly in the desired higher-order minima, a second trial position is selected. The process continues until the input port 42 matches the desired higher-order minima. Now the primary output ports 44, e.g. Order n, can be chosen based on the primary order maximum, and the secondary output ports 46, which are optically coupled to output waveguides 47, e.g. for optical channel monitoring detector array 48 made up of photo detectors, are selected based on the position of the higher order maximums, e.g. Order n-1. Ideally all of the output ports 44 and 46 are positioned along the focal line 43 of the grating 41, defined by a Rowland Circle.

Figure 7:
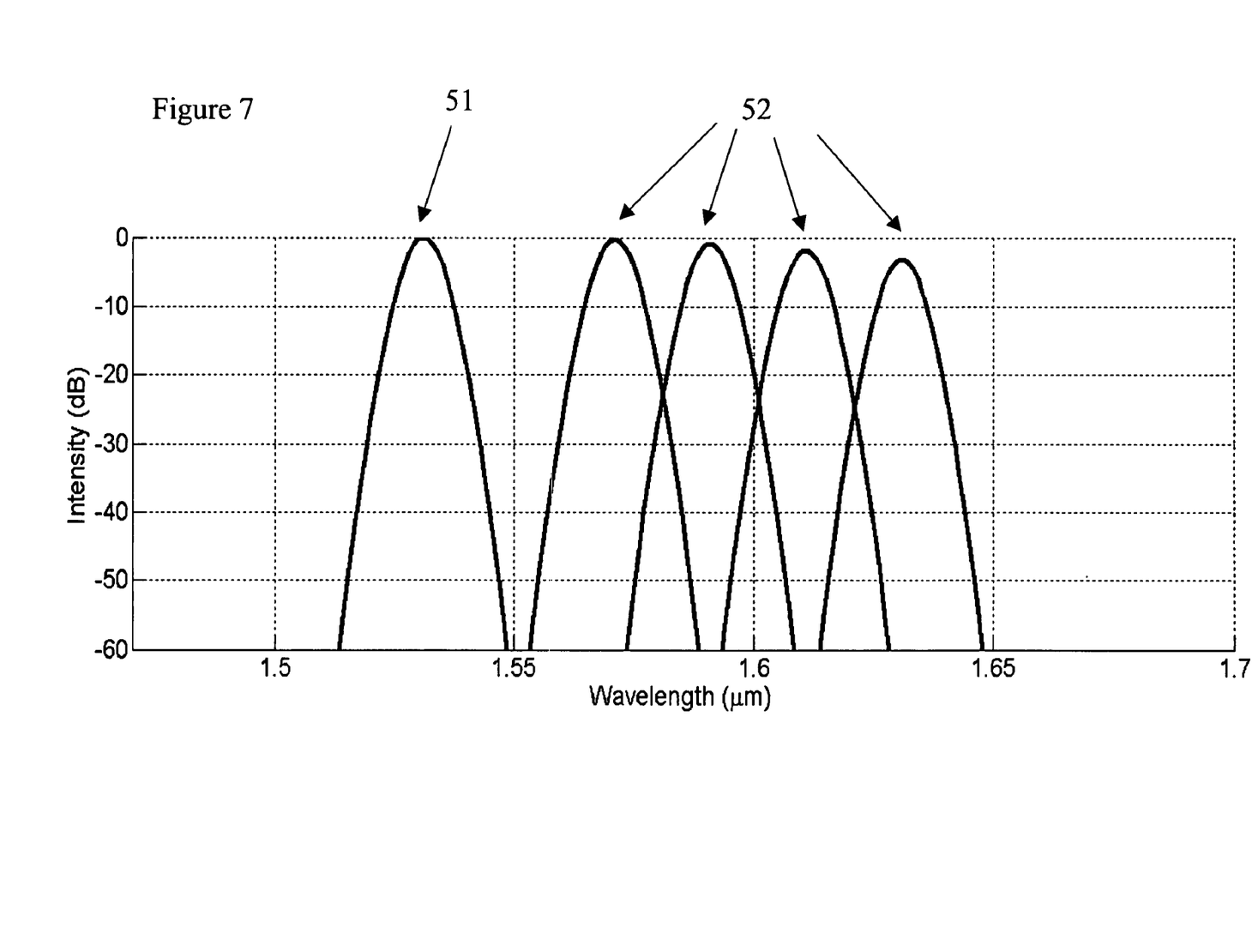
FIG. 7 illustrates a spectrum for a situation in which an input waveguide is located physically near an output waveguides.

FIG. 7 illustrates a spectrum for a situation in which the input port 42 is located physically near the output ports 44, such that the input port 42 falls somewhere within the principle diffraction maximum, which is very typical for demultiplexers based on Echelle Gratings. The intensity 51 of the return light signal is comparable to the intensity 52 of the main output signals, and can result in very high Return Loss that is unacceptable for telecommunications-grade optical components. A similar spectrum is calculated and illustrated in FIG. 8, in which the input port 42 has been located at the third diffraction envelope minimum. Note the nearly 40 dB reduction of the intensity 53 of light returning along the input channel.

Figure 8:
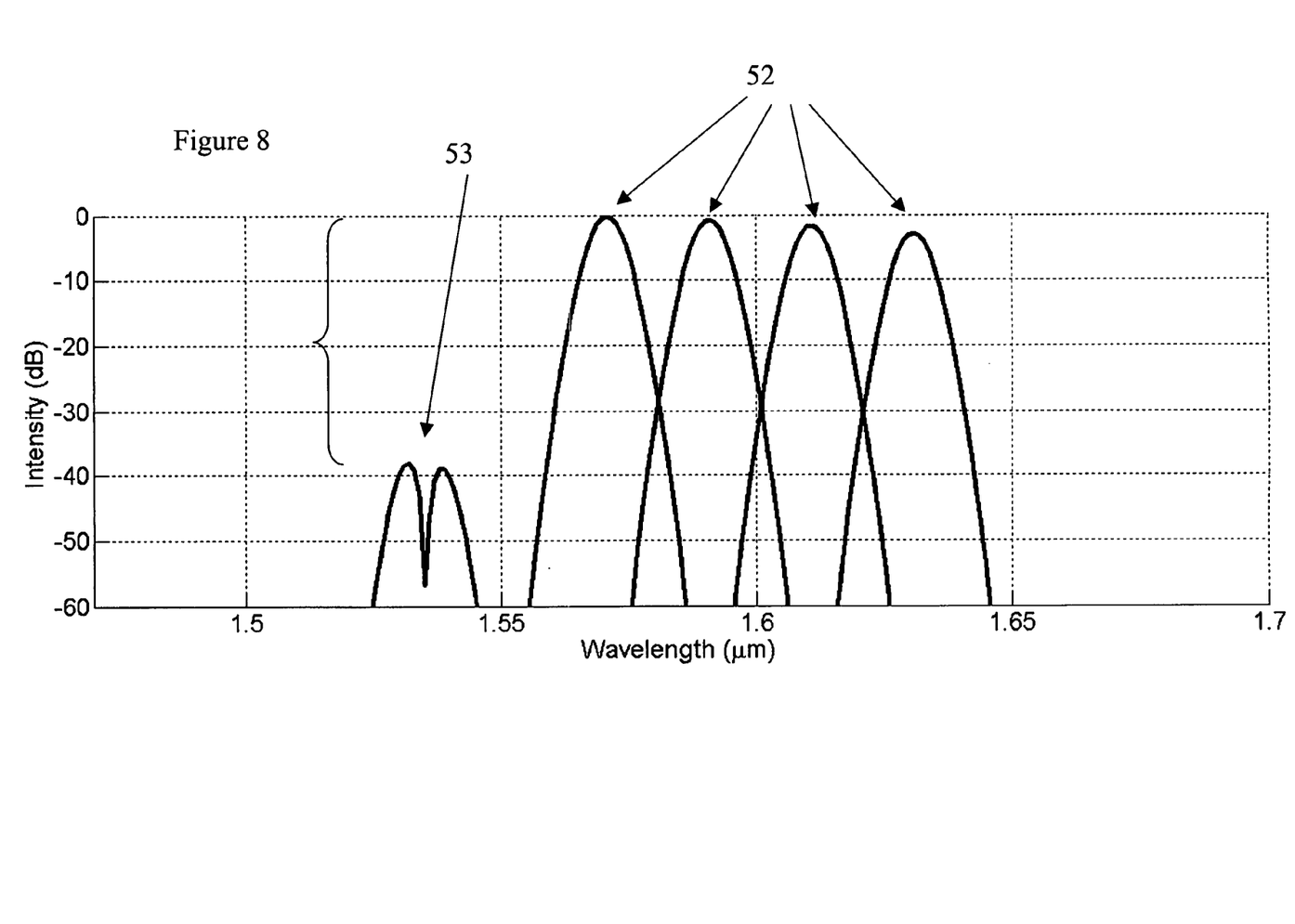
FIG. 8 illustrates a spectrum for a situation in which an input waveguide has been located at a third diffraction envelope minimum.

The sharp dip in the middle of the input channel is a result of the diffraction envelope dramatically minimizing within the span of the input port 42 itself.

The secondary set of output ports 46 are located at higher-order diffraction envelope maxima 32, see FIG. 5, to capture duplicate signals in parallel with the capture of light into the primary output waveguides 44a via primary output ports 44, which is useful, inter alia, as an integrated Demultiplexer/Optical Channel Monitor. In this case, the primary Demultiplexer output ports 44 would fit in the region of the principle diffraction envelope maximum 31, while the secondary output ports 46, e.g. channel monitor guides, for the same wavelengths but at a different diffraction order off the grating 41, would fit in the region of a secondary or higher diffraction envelope maximum 32. Accordingly, monitoring of the optical power in each channel $\lambda_1$ to $\lambda_4$ of the Demultiplexer can be performed by measurement of the light coupled into a different order, instead of through the insertion of a tap coupler and the subsequent demultiplexing/monitoring of that light signal.

We claim:

1. A planar waveguide optical device comprising:
   an input port for launching an input optical signal, which is comprised of a plurality of optical channels;
   a reflective waveguide diffraction grating for dispersing the optical signal into a diffraction envelope having a principle diffraction maximum, a plurality of higher order diffraction maxima, and a plurality of diffraction minima therebetween; and
   a first plurality of output ports outputting said optical channels;
   wherein said input port is positioned at one of said diffraction minima to limit the amount of light reflected from the reflective waveguide diffraction grating from re-entering the input port.

2. The device according to claim 1, further comprising a second plurality of output ports positioned along one of the higher order diffraction maxima for outputting light therefrom.

3. The device according to claim 2, further comprising a photo-detector optically coupled to at least one of the second plurality of output ports for use in optical channel monitoring.

4. The device according to claim 1, wherein the first plurality of output ports positioned along the principle diffraction maximum for outputting said optical channels.

5. The device according to claim 4, further comprising a second plurality of output ports positioned along one of the higher order diffraction maxima for outputting light therefrom.

6. The device according to claim 5, further comprising a photo-detector optically coupled to at least one of the second plurality of output ports for use in optical channel monitoring.

7. The planar waveguide optical device according to claim 1, wherein the reflective waveguide diffraction grating focuses the optical channels along a focal line; and wherein the input port and the first plurality of output ports is positioned substantially along the focal line.

8. The planar waveguide optical device according to claim 7, wherein the focal line defines a Rowland Circle.

9. The device according to claim 1, wherein the reflective waveguide diffraction grating has a plurality of reflective walls defined by a facet length, and a plurality of sidewalls defined by a sidewall length; and wherein an aspect ratio, defined by the facet length divided by the sidewall length, is greater than 3.

10. The device according to claims 1, wherein the reflective waveguide diffraction grating has a plurality of reflective walls defined by a facet length, and a plurality of sidewalls defined by a sidewall length; and wherein the sidewall length is less than or equal to an average wavelength of the plurality of optical channels.

11. The device according to claim 1, wherein the input port launches the input optical signal at the reflective waveguide diffraction grating at an incidence angle of less than 15°.

12. The device according to claim 1, wherein the reflective waveguide diffraction grating has a plurality of reflective walls defined by a facet length, and a plurality of sidewalls defined by a sidewall length; and wherein the facet length and the incident angle are selected to ensure that the grating provides diffraction in an order with an absolute value of 3 or less.

13. A planar waveguide optical device comprising:
   an input port for launching an input optical signal, which is comprised of a plurality of optical channels;
   a reflective waveguide diffraction grating for dispersing the optical signal into a diffraction envelope having a principle diffraction maximum, a plurality of higher order diffraction maxima, and a plurality of diffraction minima therebetween; and
   a first plurality of output ports positioned along the principle diffraction maximum for outputting said optical channels.

14. The device according to claim 13, further comprising a second plurality of output ports positioned along one of the higher order diffraction maxima for outputting light therefrom.

15. The device according to claim 14, further comprising a photo-detector optically coupled to at least one of the second plurality of output ports for use in optical channel monitoring.

16. The planar waveguide optical device according to claim 15, wherein the reflective waveguide diffraction grating focuses the optical channels along a focal line; and wherein the input port and the first plurality of output ports is positioned substantially along the focal line.

17. The planar waveguide optical device according to claim 16, wherein the focal line defines a Rowland Circle.

18. A planar waveguide optical device comprising:
an input port for launching an input optical signal, which is comprised of a plurality of optical channels;
a reflective waveguide diffraction grating for dispersing the optical signal into a diffraction envelope having a principle diffraction maximum, a plurality of higher order diffraction maxima, and a plurality of diffraction minima therebetween;
a first plurality of output ports for outputting said optical channels; and
second plurality of output ports positioned along one of the higher order diffraction maxima for outputting light therefrom.

19. The planar waveguide optical device according to claim 18, wherein the reflective waveguide diffraction grating focuses the optical channels along a focal line; and wherein the input port and the first plurality of output ports is positioned substantially along the focal line.

20. The planar waveguide optical device according to claim 19, wherein the focal line defines a Rowland Circle.

* * * * *